US012771387B2

(12) United States Patent
Berzins

(10) Patent No.: US 12,771,387 B2
(45) Date of Patent: Oct. 20, 2026

(54) OVERSAMPLED CHANNELIZER CIRCUITRY HAVING TIME-VARYING FILTER COEFFICIENTS

(71) Applicant: XILINX, INC., San Jose, CA (US)

(72) Inventor: Eduards Berzins, Penicuik (GB)

(73) Assignee: XILINX, INC., San Jose, CA (US)

(*) Notice: Subject to any disclaimer, the term of this patent is extended or adjusted under 35 U.S.C. 154(b) by 78 days.

(21) Appl. No.: 18/748,056

(22) Filed: Jun. 19, 2024

(65) Prior Publication Data

US 2025/0392334 A1 Dec. 25, 2025

(51) Int. Cl.
*H04B 1/04* (2006.01)
*H04B 1/12* (2006.01)

(52) U.S. Cl.
CPC ............. *H04B 1/0475* (2013.01); *H04B 1/12* (2013.01)

(58) Field of Classification Search
CPC ................ H04B 1/0475; H04B 1/0458; H04B 2001/0491; H04B 1/0483; H04B 1/12; H04B 1/123; H04B 1/126
See application file for complete search history.

(56) References Cited

U.S. PATENT DOCUMENTS

2014/0269852 A1* 9/2014 Pratt ...................... H04B 1/525 375/219
2019/0104002 A1* 4/2019 Thompson ......... H03H 17/0273
2020/0059222 A1* 2/2020 Cheung .............. H03H 17/0275
2023/0418898 A1* 12/2023 Peters ................ H03H 17/0275
2024/0178864 A1* 5/2024 Harris ...................... H04B 1/30

OTHER PUBLICATIONS

Harris, Fredric J. et al. "Digital receivers and transmitters using polyphase filter banks for wireless communications." IEEE Transactions on Microwave Theory and TechniquesÂ 51 (2003): 1395-1412.
Smith, Jennifer Pearl et al. "High-Throughput Oversampled Polyphase Filter Bank Using Vivado HLS and PYNQ on a RFSoC." IEEE Open Journal of Circuits and SystemsÂ 2 (2021): 241-252.
T. Koehn, et al. "An efficient structure for run-time configuration of synthesis and channelizer filter banks," 2015 International Conference on ReConFigurable Computing and FPGAs (ReConFig), Riviera Maya, Mexico, 2015, pp. 1-6.
Harris, F.J.. "Resampling Filters." Multirate Signal Processing for Communication Systems. River Publishers, 2022, pp. 167-201.

* cited by examiner

*Primary Examiner* — Dhaval V Patel
(74) *Attorney, Agent, or Firm* — Patterson + Sheridan, LLP

(57) ABSTRACT

A signal processing system includes channelizer circuitry that includes first delay circuitry that receives first data. The channelizer circuitry generates first combined data based on the first data and a first coefficient set and second combined data based on the first data and a second coefficient set. The first coefficient set differs from the second coefficient set. Further, the channelizer circuitry outputs a first signal based on at least one of the first combined data and the second combined data.

17 Claims, 9 Drawing Sheets

OVERSAMPLED CHANNELIZER CIRCUITRY HAVING TIME-VARYING FILTER COEFFICIENTS

TECHNICAL FIELD

Examples of the present disclosure generally relate to fractionally oversampled channelizer circuitry that applies different coefficient sets to the branch circuities, while maintaining the data within each respective branch circuitry.

BACKGROUND

Signal processing systems use channelizers during signal processing to convert signals between time division multiplexing (TDM) and Frequency Division Multiplexing (FDM). Example signal processing systems include communication systems, test systems, and measurement systems, among others. Channelizers are used in spectrum analysis processes. A channelizer allows for a wide bandwidth (or wide spectrum) signal to be broken up into smaller spectrum segments (channels) for processing. A channelizer may be a receiver or a transmitter. In a receiver, a signal is converted from an input FDM signal to an output TDM signal. Such a receiver may be referred to as an analysis channelizer. In a transmitter, a signal is converted from an input TDM signal to an output FDM signal. Such a transmitter may be referred to as a synthesis channelizer.

Channelizers may be critically sampled (or maximally decimated). In such channelizers, the sum of the input rate is equal to the sum of the output rate. The sum of the input rate is the combined rate (frequency) of the input channels and the sum output rate is the combined rate (frequency) of the output channels. In other implementations, channelizers are non-critically sampled (also known as non-maximally decimated or oversampled). In a non-critically sampled channelizer, a TDM signal (e.g., the input or output signal) has a higher sum rate than the FDM signal (e.g., the output or input signal) by an oversampling factor. Non-critically sampled channelizers improve the signal processing process by reducing the in-band signal distortion.

Non-critically sampled channelizers include two times (2×) oversampled channelizers and fractionally oversampled channelizers. A fractionally oversampled channelizer has an oversampling value of between one and two. Two times oversampled channelizers are implemented by correspondingly increasing the processing and memory resources of the channelizer. However, there is a need for a processing and memory resource efficient implementation of a fractionally oversampled channelizer.

SUMMARY

In one example, a channelizer circuitry includes first delay circuitry that receives first data. The channelizer circuitry generates first combined data based on the first data and a first coefficient set and second combined data based on the first data and a second coefficient set. The first coefficient set differs from the second coefficient set. Further, the channelizer circuitry outputs a first signal based on at least one of the first combined data and the second combined data.

In one example, a method includes receiving first data at a first delay circuitry of channelizer circuitry, and generating first combined data based on the first data and a first coefficient set. Further, the method includes generating second combined data based on the first data and a second coefficient set. The first coefficient set differs from the second coefficient set. The method further includes outputting a first signal based on at least one of the first combined data and the second combined data.

In one example, a signal processing system includes channelizer circuitry. The channelizer circuitry includes first delay circuitry that receives first data. The channelizer circuitry generates first combined data based on the first data and a first coefficient set and second combined data based on the first data and a second coefficient set. The first coefficient set differs from the second coefficient set. The channelizer circuitry further outputs a first signal based on at least one of the first combined data and the second combined data. Further, the processing system includes processing circuitry that receives the first signal and performs a signal processing operation on the first signal.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
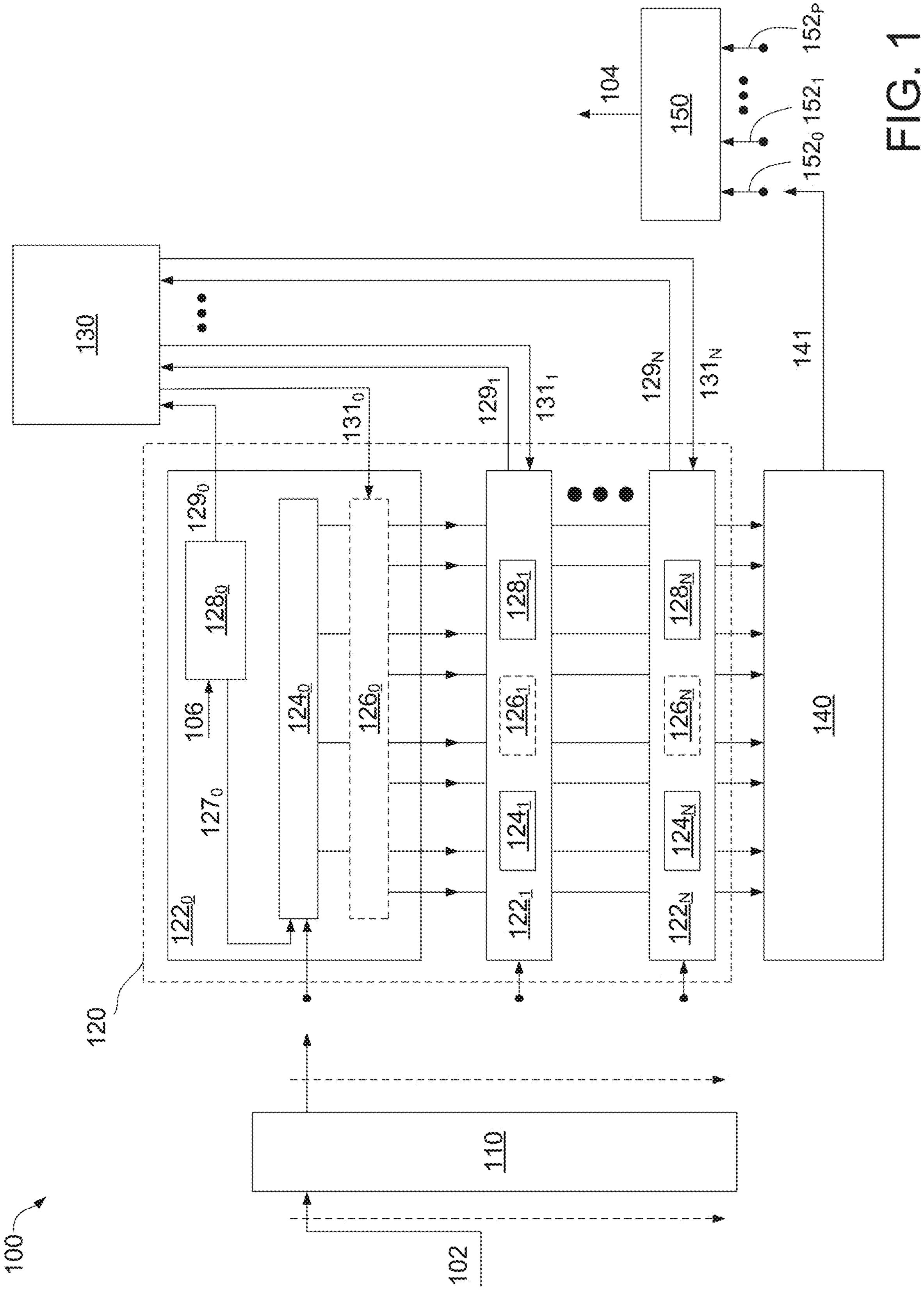
FIG. 1 illustrates a schematic block diagram of receiver channelizer circuitry.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Signal processing systems include channelizer circuitries that segment (divide, partition, decompose, or separate) an input signal into multiple channels (segments or sub-bands) for analysis. In a signal processing system, a channelizer circuitry decomposes an input signal into lower-rate channels. The lower-rate channels are processed to process the input signal. The processed lower-rate channels are recombined into an output signal having a rate that corresponds to the input signal.

Channelizer circuitries (or channelizers) convert an input signal between time division multiplexing (TDM) and Frequency Division Multiplexing (FDM). Channelizer circuitry can be receiver circuitry or transmitter circuitry. In receiver channelizer circuitry, an input signal is converted from being an FDM signal to a TDM signal. In transmitter channelizer circuitry, an input signal is converted from being a TDM signal to a FDM signal.

In one or more examples, channelizer circuitry of a signal processing system oversamples (e.g., non-critically samples) an input signal when separating the input signal into the multiple channels. The oversampling factor is greater than one. In one example, the oversampling factor is two. In another example, the oversampling factor is between one and two. Such an oversampling technique is referred to as fractionally oversampling. A fractionally oversampled channelizer may be described as being an M/D fractionally oversampled channelizer. M is the number of channels. D is a decimation factor (or sampling interval). Oversampling the input signal mitigates in-band signal distortion, improving the performance of the signal processing system.

In one or more examples, channelizers employ polyphase-filter-banks (PFB) circuitry and a Fast Fourier Transform (FFT). A PFB circuitry implements a prototype filter function (e.g., a bandpass filter function, among others). An FFT or inverse FFT (IFFT) is connected to an input or output of the branch circuitries to process data communicated to or from the PFB circuitry.

Current implementations of oversampled channelizers either increase the processing resources or add complex processing procedures that require additional memory and processing resources. Accordingly, the current implementations have an increased semiconductor manufacturing cost due to the additional processing resources and/or have reduced performance due to the complex processing procedures. In the following, an improved oversampled channelizer is described. As is described in further detail, a PFB circuitry is implemented, where the branch circuitries of the PFB are independent from each other. Further, during each cycle a coefficient set is selected and applied to each branch circuitry, while the data is maintained with each branch circuitry. The data does not move between branch circuitries during processing. For example, once data is loaded into a branch circuitry, the data remains with that branch circuitry until the data is processed. In other implementations, data moves between branch circuitries during processing. In such systems, the data associated with the branch circuitries is reordered before the data is output to FFT circuitry or input from iFFT circuitry. Accordingly, such implementations use an increased amount of processing resources, increasing the semiconductor manufacturing costs and design complexity of such implementations.

The oversampled channelizer as described herein is less complex than other implementations as the oversampled channelizer maintains data with a branch circuitry during the processing process such that the data in each branch circuitry is independent from each other. Hence, the oversampled channelizers as described herein do not re-order data or apply post-correction processes to the data prior to or after being processes by FFT or iFFT circuitry. Thus, the oversampled channelizes described herein are more power efficient than and/or have a lower semiconductor manufacturing cost than other implementations.

Usable channel bandwidth is used as a factor when designing receiver and transmitter channel circuitries. As finite impulse response (FIR) filters have a finite roll-off, signal power at the band-edges is lost and a channel of interest may not be perfectly separated from neighboring channels, causing inter-channel interference. Oversampled channel circuitries mitigate signal power and/or inter-channel interference issues. Oversampled channel circuities mitigate distortion due to filter roll-off. Accordingly, the signal-to-noise ratio (SNR) of oversampled channels is greater than critically sampled channels within the signal band of interest.

FIG. 1 illustrates a block diagram of receiver channelizer circuitry 100, according to one or more examples. The receiver channelizer circuitry 100 receives the signal (e.g., input signal) 102, and outputs the signal (e.g., output signal) 104. The signal 102 is a FDM signal. In one example, the signal 102 has a rate of 1 giga samples per second (GSPS). In other examples, the signal 102 has rate that is less than or greater than 1 GSPS. The signal 104 is a TDM signal. The signal 104 has a rate based on the oversampling rate (OSR) of the receiver channelizer circuitry 100. In other examples, the rate of the signal 104 (e.g., the output rate) is OSR times greater than the input rate.

The receiver channelizer circuitry 100 includes buffer circuitry 110, PFB circuitry 120, memory circuitry 130, accumulator circuitry 140, and FFT circuitry 150. The buffer circuitry 110 receives the signal 102. The output of the buffer circuitry 110 is coupled to the input of the PFB circuitry 120. The PFB circuitry 120 includes branch circuitries 122. The PFB circuitry 120 is coupled to the memory circuitry 130 and to the accumulator circuitry 140. The output of the accumulator circuitry 140 is coupled to the FFT circuitry 150.

The buffer circuitry 110 may be a first-in-first-out (FIFO) buffer circuitry. In other examples, the buffer circuitry 110 is not limited to being a FIFO buffer circuitry and may be another type of buffer circuitry. The buffer circuitry 110 has one or more channels. In one example, the number of channels of the buffer circuitry 110 is at least as large as the number of branch circuitries 122 of the PFB circuitry 120.

In one example, the buffer circuitry 110 transfers the input data from a first clock domain to a second clock domain. The rate (or frequency) of the first clock domain is less than the rate (or frequency) of the second clock domain. For example, the buffer circuitry 110 transfers the input signal 102 from the lower rate clock domain (e.g., 1 GHZ) to the higher rate clock domain (e.g., OSR times the rate of the input clock domain).

The buffer circuitry 110 receives the signal 102 and buffers the data of the signal 102. The buffer circuitry 110 outputs the buffered data of the signal 102 to the PFB circuitry 120. In one example, the buffer circuitry 110 outputs data to one or more of the branch circuitries 122 of the PFB circuitry 120 based on cycles of a clock signal and based on the strobe signal 127. For example, the buffer circuitry 110 outputs data to the branch circuitry $\mathbf{122}_0$ of the PFB circuitry 120 at a first cycle of the clock signal and based on the strobe signal $\mathbf{127}_0$. As is described in greater detail in the following, the strobe signal 127 generated by the phase control circuitry 128 controls whether or not data is loaded into a branch circuitry 122 for a clock cycle. In one example, for four branch circuitries 122 (e.g., branch circuitries $122_0$-$122_3$) and a decimation factor of 3, data is loaded (or shifted) into the branch circuitries 122 every three out of four clock cycles, and as defined by the corresponding strobe signals 127. In one example, the buffer circuitry 110 outputs data to the branch circuitries 122 of the PFB circuitry 120 in any order.

The branch circuitries 122 include branch circuitries $122_0$-$122_N$. N is one or more. A branch circuitry 122 includes delay circuitry 124 and phase control circuitry 128. In other examples, the phase control circuitry 128 is external to and coupled to the branch circuitries 122. In such an example, the phase control circuitry 128 is coupled to two or more of the branch circuitries 122. In one example, a first phase control circuitry 128 is coupled to one or more branch circuitries 122 and a second phase control circuitry 128 is coupled to one or more branch circuitries 122. In one or more examples, the number of phase control circuitries 128 is less than, equal to, or greater than the number of branch circuitries 122. The phase control circuitry 128 controls the branch circuitry 122 coupled to the phase control circuitry 128 as described in the following.

The delay circuitry 124 receives and stores data from the buffer circuitry 110. The delay circuitry 124 is a buffer, or register, that stores the received data. The data is stored within buffer locations of the buffer, or registers of the register. In one example, data is shifted within a delay circuitry 124 based on the strobe signal 127. The strobe signal 127 controls whether or not data is loaded and shifted within a corresponding delay circuitry 124. For example, based on the strobe signal 127 including an indication to load data into and shift data within a delay circuitry 124, data is loaded into and shifted within a delay circuitry 124 based on a cycle of a clock signal. In one example, based on the strobe signal 127 not including an indication to load data into and shift data within a delay circuitry 124, data is not loaded into and shifted within a delay circuitry 124.

The phase control circuitry 128 outputs a control signal 129 to the memory circuitry 130. The control signal 129 includes an indication as to which coefficient set to output to the corresponding branch circuitry 122 via signal 131. The coefficient set is represented as selected coefficient set 126 in FIG. 1. In one example, the phase control circuitry 128 receives a decimation factor 106, and generates the control signal 129 based on the decimation factor 106. The decimation factor 106 has a value of one or more and defines the sampling interval. The decimation factor 106 sets the oversampling ratio of the receiver channelizer circuitry 100.

The phase control circuitry 128 outputs the strobe signal 127. The strobe signal 127 controls whether or not data is loaded into a respective delay circuitry 124. In one example, a delay circuitry 124 includes circuitry that receives the strobe signal 127, and controls whether or not data is loaded into the corresponding delay circuitry 124 based on a value of the strobe signal 127. In another example, circuitry external to the delay circuitry 124 receives the strobe signal 127, and controls whether or not data is loaded into the corresponding delay circuitry 124 based on a value of the strobe signal 127.

The output of each branch circuitry 122 is connected to the accumulator circuitry 140. A branch circuitry 122 outputs the data within the delay circuitry 124 and the selected coefficient set 126 to the accumulator circuitry 140. The accumulator circuitry 140 combines the data within the delay circuitry 124 with the selected coefficients set 126. The delay circuitry 124 outputs the corresponding data and selected coefficient set 126 for every cycle of the clock signal. In one or more examples, while data is not shifted into the delay circuitry 124 every cycle of the clock signal, data and the selected coefficient set 126 is output every cycle of the clock signal. In one example during a first cycle of the clock signal, the delay circuitry $124_0$ outputs corresponding data and the selected coefficient set $126_0$ is output. During a second cycle of the clock signal, the delay circuitry $124_1$ outputs corresponding data and the selected coefficient set $126_1$ is output. The process of outputting data from the delay circuitries 124 and outputting the selected coefficient set 126 is repeated during cycles of the clock signal.

The accumulator circuitry 140 outputs the signal 141 based on the received data and coefficient set. In one example, the accumulator circuitry 140 includes multiplier circuitry that multiplies data within a register or buffer location received from the delay circuitry 124 with a respective coefficient of the coefficient set. For example, the delay circuitry $124_0$ stores data $d_0$, $d_1$, and $d_2$, and the selected coefficient set $126_0$ includes coefficients $c_0$, $c_1$, and $c_2$. The data $d_0$ is associated with coefficient $c_0$, the data $d_1$ is associated with coefficient $c_1$, and the data $d_2$ is associated with coefficient $c_2$. First multiplier circuitry of the accumulator circuitry 140 multiplies data $d_0$ with the coefficient $c_0$, second multiplier circuitry of the accumulator circuitry 140 multiplies data $d_1$ with the coefficient $c_1$, and third multiplier circuitry of the accumulator circuitry 140 multiplies data $d_2$ with the coefficient $c_2$. The output of multiplier circuitries are combined via one or more summation circuitries that generate a combined output signal (e.g., the signal 141) by summing the output of the multiplier circuitries. In one or more examples, the data and/or the coefficients are either real or complex numbers. Further, the multiplier circuitries and summation circuitries of the accumulator circuitry 140 are either real or complex.

In other examples, the accumulation circuitry 140 combines the data within the delay circuitries 124 and selected coefficient set 126 to generate the combined data, and the output signal 141 using a combination of additional or other circuit elements.

The FFT circuitry 150 receives the signal 141. The FFT circuitry 150 has a point size of one or more. In one example, the point size of the FFT circuitry 150 corresponds to the number of branch circuitries 122. The FFT circuitry 150 generates the signal 151 based on the signal 141 by performing an FFT operation on the signal 141 or an inverse FFT (IFFT) operation on the signal 141.

In one example, the FFT circuitry 150 includes ports $152_0$-$152_P$. The branch circuitries 122 are associated with the ports 152. In one example, each branch circuitry 122 is associated with a respective port 152. In one example, associating a branch circuitry 122 with a port 152 of the FFT circuitry 150 includes coupling the branch circuitry 122 with the port 152 via the accumulator circuitry 140.

In one or more examples, combined data determined from the data and coefficient set of each branch circuitry 122 is output to a respective one of the ports 152. In one example, the branch circuitry $122_0$ is associated with the port $152_0$. Accordingly, combined data determined from the data and coefficient set of the branch circuitry $122_0$ is output to the port $152_0$ via the signal 141. The branch circuitry $122_1$ is associated with the port $152_1$. Accordingly, combined data determined from the data and coefficient set of the branch circuitry $122_1$ is output to the port $152_1$ via the signal 141. The branch circuitry $122_N$ is associated with the port $152_P$.

Accordingly, combined data determined from the data and coefficient set of the branch circuitry $122_N$ is output to the port $152_P$ via the signal 141.

Figure 2:
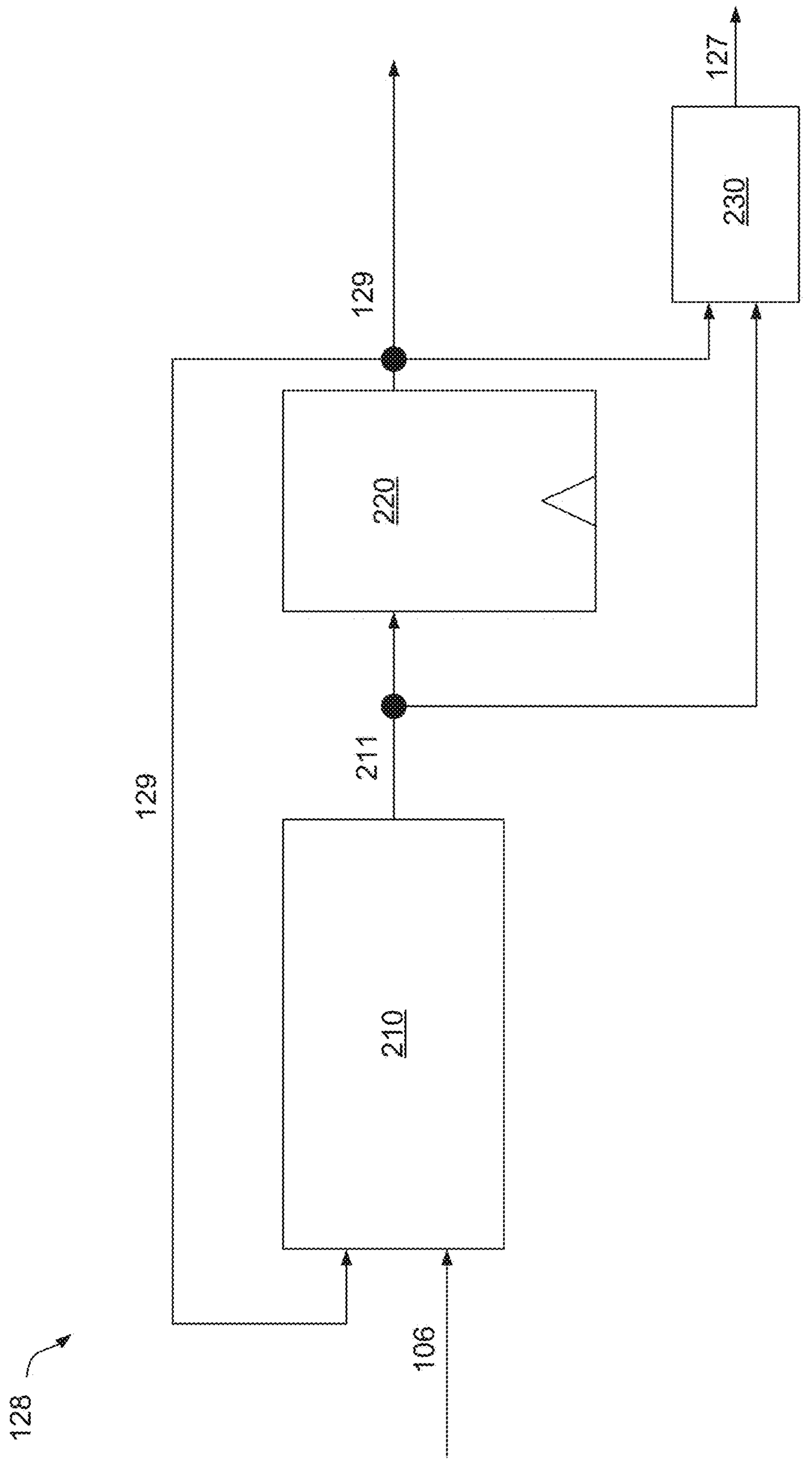
FIG. 2 illustrates a schematic block diagram of phase controller circuitry for receiver channelizer circuitry.

FIG. 2 illustrates a schematic block diagram of the phase control circuitry 128. The phase control circuitry 128 generates the control signals 127 and 129 based on the decimation factor 106. The phase control circuitry 128 includes comparison circuitry 210, register circuitry 220, and strobe circuitry 230. In other examples, the phase control circuitry 128 may have other configurations that receive the decimation factor 106 and generate the control signals 127 and 129 from the decimation factor 106.

In one example, a difference between the value of the decimation factor 106 and the value of the control signal 129 is determined. For example, the value of the decimation factor 106 is subtracted from the value of the control signal 129. In other examples, the difference is determined in other ways. In one example, the comparison circuitry 210 receives the control signal 129 and the decimation factor 106. The comparison circuitry 210 determines a difference between the value of the decimation factor 106 and the value of the control signal 129 to determine the signal 211. In one example, the difference between the decimation factor 106 and the value of the control signal 129 is cast from a signed 2s compliment number to an unsigned value by the comparison circuitry 210. For example, given a 4-bit 2's compliment signed "−7" would become "1", and "−6" would become "2".

The signal 211 is received by the register circuitry 220. The register circuitry 220 stores the signal 211. In one example, the register circuitry 220 stores the signal 211 based on a cycle of a clock signal. The register circuitry 220 outputs the value of the signal 211 as the control signal 129. The register circuitry 220 outputs the value of the signal 211 as the control signal 129 based on a cycle of a clock signal. In one example, the register circuitry 220 is preloaded with a starting value. In such an example, the control signal 129 has the starting value. The starting value of the register circuitry 220 is updated with the value of the signal 211. The starting value corresponds to a coefficient set within the memory circuitry 130. For example, to start within a particular coefficient set, the register circuitry 220 is loaded with the value of the coefficient set.

The signal 211 is received by the strobe circuitry 230. The strobe circuitry 230 receives the control signal 129. The strobe circuitry 230 generates the strobe signal 127 from the control signal 129 and the signal 211. In one example, the strobe circuitry 230 compares the value of the control signal 129 to the value of the signal 211 to determine which signal has a greater value, or if the signals have an equal value. In one example, the strobe circuitry 230 determines if the value of the control signal 129 is less than or equal to the value of the signal 211.

The strobe signal 127 controls whether or not data is loaded (e.g., shifted) into the delay circuitry 124. In one example, based on the signal 211 having a value that is greater than that of the control signal 129, the strobe signal (e.g., control signal) 127 provides an indication to load data. Based on the signal 211 having a value that is less than or equal to that of the control signal 129, the strobe signal 127 provides an indication to not load data.

In one example, data is loaded into the delay circuitry 124 for a number cycles that is less than the number of channels (e.g., number of branch circuitries 122 or M). In one example, the number of channels (M) is 8 and the decimation factor (D) is 7. In such an example, the oversampling factor is 8/7 (M/D) or 1.14. In such an example, data is loaded into the delay circuitries 124 7 times (or D times) out of 8 cycles. Further, in such an example, during each cycle, a different coefficient set 126 is selected by the memory circuitry 130 based on the control signal 129 and output to the corresponding branch circuitry 122.

With further reference to FIG. 1, each branch circuitry $122_1$-$122_N$ is loaded with a different starting coefficient reference value. The coefficient reference value corresponds to a different set of coefficients within the memory circuitry 130. For example, the register circuitry 220 of each phase control circuitry 128 of each branch circuitry 122 is preloaded with a different coefficient reference value.

In one or more examples, the receiver channelizer circuitry 100 is dynamically configurable from a critically sampled channelizer and an oversampled channelizer by changing the decimation factor (e.g., the decimation factor 106) based on the number of branch circuitries 122 and/or changing the operating clock rate of the clock domain of the PFB circuitry 120 based on the clock domain of the input signal 102. In one example, the decimation factor 106 is changed to match the number of branch circuitries 122. In another example, the clock domain of the PFB circuitry 120 is changed to match the clock domain of the input signal 102.

Figure 3:
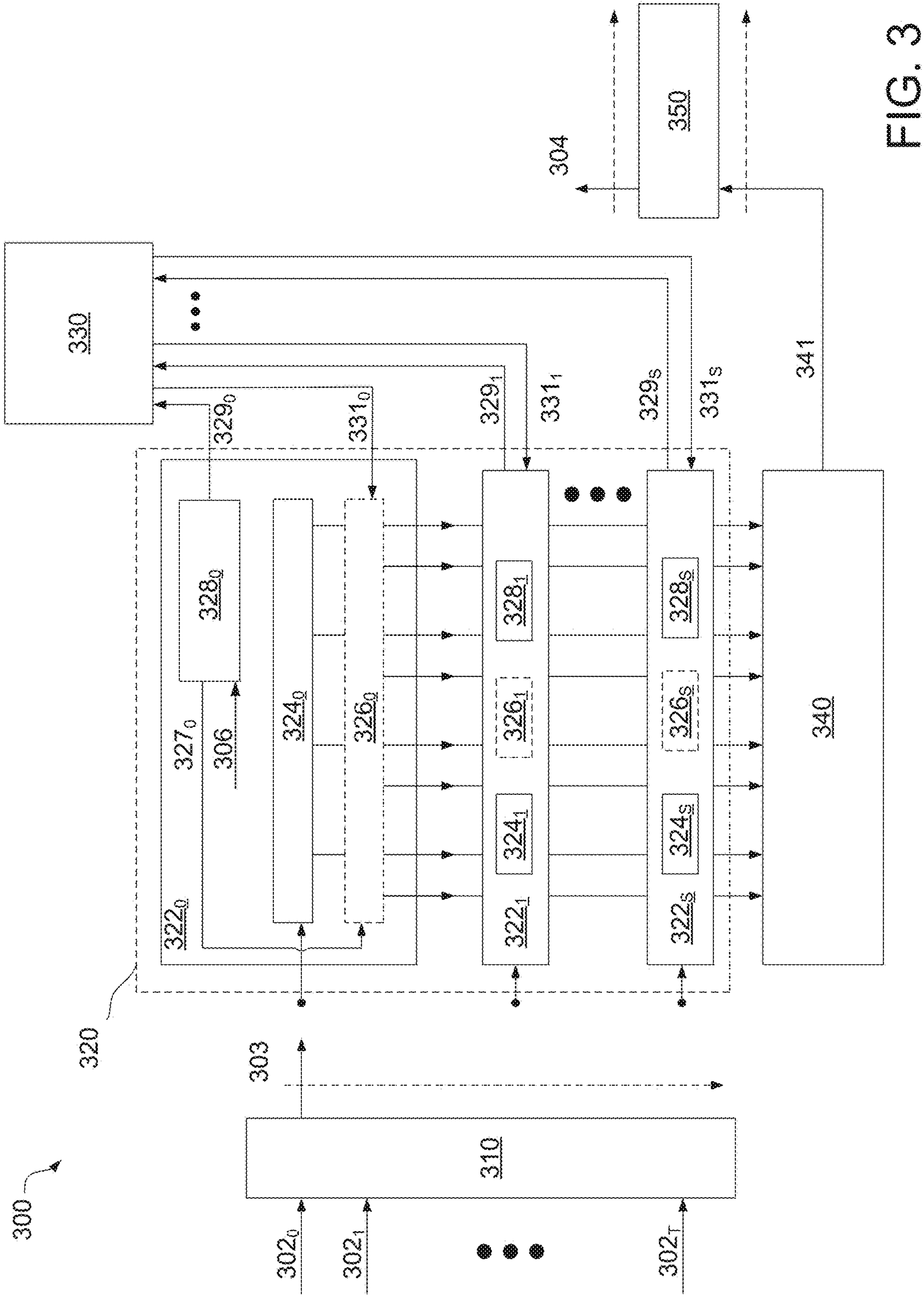
FIG. 3 illustrates a schematic block diagram of transmitter channelizer circuitry.

FIG. 3 illustrates a block diagram of transmitter channelizer circuitry 300, according to one or more examples. The transmitter channelizer circuitry 300 receives the signal (e.g., input signal) 302, and outputs the signal (e.g., output signal) 304. The signal 302 is a TDM signal. The signal 302 includes channels $302_0$-$302_T$. T is one or more. In one example, the signal 302 has a rate of 1 GSPS. In other examples, the signal 302 has rate that is less than or greater than 1 GSPS. The signal 304 is a FDM signal. The signal 304 has a rate less than the rate of the signal 302. The rate of the signal 302 is OSR times larger than the rate of the signal 304. In other examples, the signal 304 has rate that is less than or greater than 1 GSPS. The clock frequency associated with the signal 302 (input rate clock domain) is greater than the clock signal frequency of the signal 304 (output rate clock domain).

In one example, the buffer circuitry 350 transfers the data of the signal 302 from a first clock domain to a second clock domain. The rate (or frequency) of the first clock domain is greater than the rate (or frequency) of the second clock domain. For example, the buffer circuitry 350 transfers data of the input signal 302 from the higher rate input clock domain (e.g., OSR times the rate of the output clock domain) to the lower rate output clock domain.

The transmitter channelizer circuitry 300 includes FFT circuitry 310, PFB circuitry 320, memory circuitry 330, accumulator circuitry 340, and buffer circuitry 350. The FFT circuitry 310 receives the signal 302. The output of the FFT circuitry 310 is coupled to the input of the PFB circuitry 320. The PFB circuitry 320 includes branch circuitries 322. The PFB circuitry 320 is coupled to the memory circuitry 330. The PFB circuitry 320 is coupled to the accumulator circuitry 340. The output of the accumulator circuitry 340 is coupled to the input of the buffer circuitry 350.

The FFT circuitry 310 receives the signal 302. The FFT circuitry 310 has one or more points. In one example, the number of points corresponds to the number of branch circuitries 233. The FFT circuitry 310 performs a FFT function or an IFFT function on the channels $302_0$-$302_T$ of the signal 302 to generate the signal 303 from the signal 302.

The branch circuitries 322 include branch circuitries $322_0$-$322_S$. S is one or more. A branch circuitry 322 includes delay circuitry 324 and phase control circuitry 328. In other examples, the phase control circuitry 328 is external to and coupled to the branch circuitries 322. In such an example, the phase control circuitry 328 is coupled to two or more of the branch circuitries 322. In one example, a first phase control circuitry 328 is coupled to one or more branch circuitries 322 and a second phase control circuitry 328 is coupled to one or more branch circuitries 322. In one or more examples, the number of phase control circuitries 328 is less than, equal to, or greater than the number of branch circuitries 322.

Each branch circuitry 322 is coupled to a respective channel of the FFT circuitry 310. The FFT circuitry 310 includes one or more channels, channels 0-R. The channel 0 is coupled to and outputs data to the delay circuitry $\mathbf{324}_0$. The channel 1 is coupled to and outputs data to the delay circuitry $\mathbf{324}_1$. The channel R is coupled to and outputs data to the delay circuitry $\mathbf{324}_R$.

The delay circuitry 324 receives and stores data from the signal 303. The delay circuitry 324 is configured similar to the delay circuitry 124. For example, the delay circuitry 324 is a buffer, or register, that stores the received data. The data is stored within buffer locations, or registers of the delay circuitry 124. In one example, the delay circuitry 324 receives and stores data (e.g., data is shifted into the delay circuitry 324) based on each cycle of a corresponding clock signal.

The phase control circuitry 328 is configured similar to the phase control circuitry 128 of FIG. 1. The phase control circuitry 328 outputs a control signal 329 to the memory circuitry 330. The control signal 329 includes an indication as to which coefficient set to output via signal 331. In one example, the phase control circuitry 328 receives a decimation factor 306, and generates the control signal 329 based on the decimation factor 306. The decimation factor 306 is one or more and defines the sampling interval.

The phase control circuitry 328 further outputs the compute signal 327. The compute signal 327 controls whether or not data output from the delay circuitry 324 is combined with the selected coefficient set 326. The compute signal 327 is received by branch circuitry 322, the accumulator circuitry 340, and/or other circuitry of the PFB circuitry 320. The branch circuitry 322, the accumulator circuitry 340, and/or other circuitry of the PFB circuitry 320 controls whether or not data output from the delay circuitry 324 is combined with the selected coefficient set 326 based on a value (e.g., an indication) of the compute signal 327.

The output of each branch circuitry 322 is connected to the accumulator circuitry 340. A branch circuitry 322 outputs the data within the delay circuitry 324 and the selected coefficient set 326 to the accumulator circuitry 340. For example, the branch circuitry 322 outputs the data within the delay circuitry 324 and the selected coefficient set 326 to the accumulator circuitry 340 based on the compute signal 327. The compute signal 327 controls the branch circuitries 322 to output the data within the delay circuitry 324 and the selected coefficient set 326 for D of M clock cycles. In one example, D is seven and M is eight. In such an example, a branch circuitry 322 outputs data within a corresponding delay circuitry 324 and the corresponding selected coefficient set for seven out of eight clock cycles. In one or more examples, data is loaded into (e.g., shifted into) a delay circuitry 324 once each clock cycle, and data and a selected coefficient set is output to the accumulator circuitry 340 for a portion of the clock cycles.

The accumulator circuitry 340 combines the data within the delay circuitry 124 with the selected coefficients set 326. The delay circuitry 324 outputs the corresponding data and a corresponding selected coefficient sets 326 is output for a cycle of the clock signal.

In one example during a first cycle of the clock signal, the delay circuitry $\mathbf{324}_0$ outputs corresponding data and corresponding selected coefficient set $\mathbf{326}_0$ is output. During a second cycle of the clock signal, the delay circuitry $\mathbf{324}_1$ outputs corresponding data and a corresponding selected coefficient set $\mathbf{326}_1$. This process of outputting data from delay circuitries 324 and the selected coefficient set 326 is repeated during cycles of the clock signal.

The accumulator circuitry 340 outputs the signal 341 based on the received data and coefficient set. The accumulator circuitry 340 function similar as described above with regard to the accumulator circuitry 140 to generate the combined data from the data of the delay circuitries 324 and the selected coefficient set 326. For example, the accumulator circuitry 340 includes multiplier circuitries that combine data received from the delay circuitries 324 with coefficients of a selected coefficient set 326. The output of each multiplier is combined to generate the signal 341. In other examples, the data and coefficients of the coefficient set may be combined in other ways. In one or more examples, the data and/or the coefficients are either real or complex numbers. Further, the multiplier circuitries and summation circuitries of the accumulator circuitry 340 are either real or complex.

The buffer circuitry 350 may be a FIFO buffer circuitry. In other examples, the buffer circuitry 350 is not limited to being a FIFO buffer circuitry, and may be another type of buffer circuitry. The buffer circuitry 350 includes one or more channels. In one example, the number of channels of the buffer circuitry 350 is at least as large as the number of branch circuitries 322. The buffer circuitry 350 receives the signal 341 and buffers the data of the signal 341. The buffer circuitry 350 outputs the signal 304.

Figure 4:
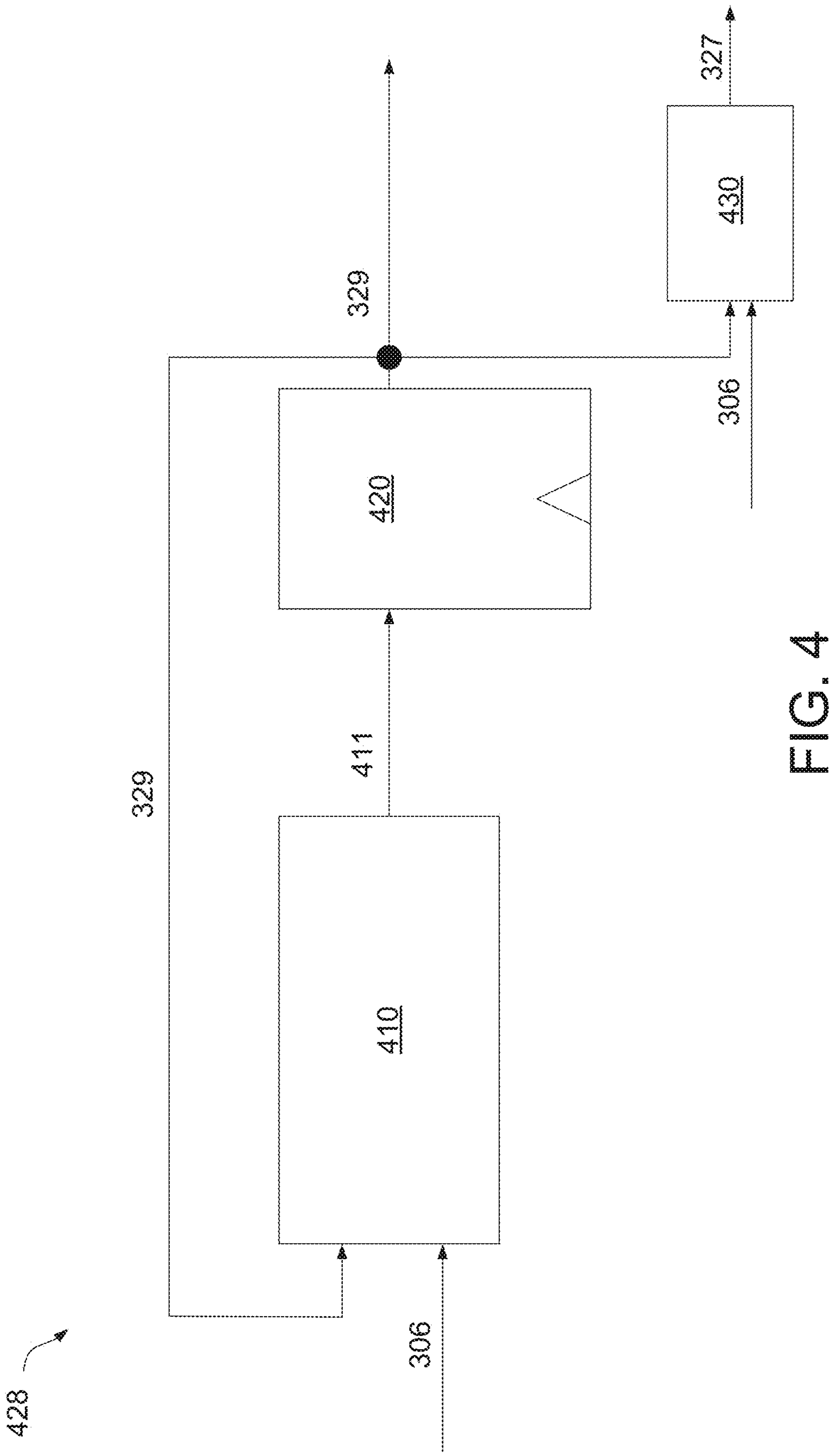
FIG. 4 illustrates a schematic block diagram of phase controller circuitry for transmitter channelizer circuitry.

FIG. 4 illustrates a schematic block diagram of the phase control circuitry 428. The phase control circuitry 428 generates the controls signals 327 and 329 based on the decimation factor 306. The phase control circuitry 428 includes comparison circuitry 410, register circuitry 420, and strobe circuitry 430. In other examples, the phase control circuitry 428 may have other configurations that receive the decimation factor 306 and generate the controls signals 327 and 329 from the decimation factor 306.

In one example, a difference between the value of the decimation factor 306 and the value of the control signal 329 is determined. For example, the value of the decimation factor 306 is subtracted from the value of the control signal 329. In other examples, the difference is determined in other ways. In one example, the comparison circuitry 410 receives the control signal 329 and the decimation factor 306. The comparison circuitry 410 determines a difference between the value of the control signal 329 and the value of the control signal 329 to determine the signal 411. In one example, the difference between the decimation factor 106 and the value of the control signal 129 is cast from a signed 2s compliment number to an unsigned value by the comparison circuitry 410. For example, given a 4-bit 2's compliment signed "−7" would become "1", and "−6" would become "2". The signal 411 is received by the register circuitry 420. The register circuitry 420 stores the signal 411. In one example, the register circuitry 420 stores the signal 411 based on a cycle of a clock signal. The register circuitry 420 outputs the value of the signal 411 as the control signal 329. The register circuitry 220 outputs the value of the signal 211 as the control signal 129 based on a cycle of a clock signal. In one example, the register circuitry 220 is pre-loaded with a value (e.g., a starting value). In such an example, the control signal 429 has the starting value. The starting value of the register circuitry 420 is updated with the value of the signal 411. The starting value corresponds to a coefficient set within the memory circuitry 330. For example, each coefficient set within the memory circuitry 330 is associated with a corresponding value. Loading a starting value within the register circuitry 420 associates a corresponding coefficient set with a corresponding branch circuitry 322.

The signal 411 is received by the strobe circuitry 430. The strobe circuitry 430 receives the decimation factor 306. The strobe circuitry 430 generates the control signal 327 from the signal 411 and the decimation factor 306. In one example, the strobe circuitry 430 compares the value of the signal 411 to the value of the decimation factor 306 to determine which signal has a greater value, and/or if the signals have an equal value. In one or more examples, the value of the decimation factor 306 is reduced by one (or more) before being compared to the value of the signal 411.

The control signal 327 controls whether or not the coefficients of the selected coefficient set 326 are combined within the data within the delay circuitry 324. In one example, when the value of the signal 411 is less than or equal to the value of the decimation factor 306 minus 1 (e.g., D−1), the control signal 327 indicates to combine the coefficients of the coefficient set with the data. In one example, when the value of the signal 411 is greater than the value of the decimation factor 306 minus 1 (e.g., D−1), the control signal 327 indicates to not combine the coefficients of the coefficient set with the data. In In one example, the accumulator circuitry 340 performs a computation to combine the coefficients of the coefficient set with the data for a number of cycles that is less than the number of channels (e.g., number of branch circuitries 322 or M). In one example, the number of channels (M) is 8 and the decimation factor (D) is 7. In such an example, the oversampling factor is 8/7 (M/D) or 1.14. In such an example, a computation is performed 7 time (or D times) out of 8 cycles. Further, in such an example, during each cycle, a different coefficient set is selected by the memory circuitry 130 based on the control signal 129.

In one or more examples, the transmitter channelizer circuitry 300 is dynamically configurable from a critically sampled channelizer and an oversampled channelizer by decimation factor (e.g., the decimation factor 306) based on the number of branch circuitries 322 and/or changing the operating clock rate of the clock domain of the PFB circuitry 320 based on the clock domain of the input signal 302. In one example, the decimation factor 306 is changed to match the number of branch circuitries 322. In another example, the clock domain of the PFB circuitry 320 is changed to match the clock domain of the input signal 302.

Figure 5:
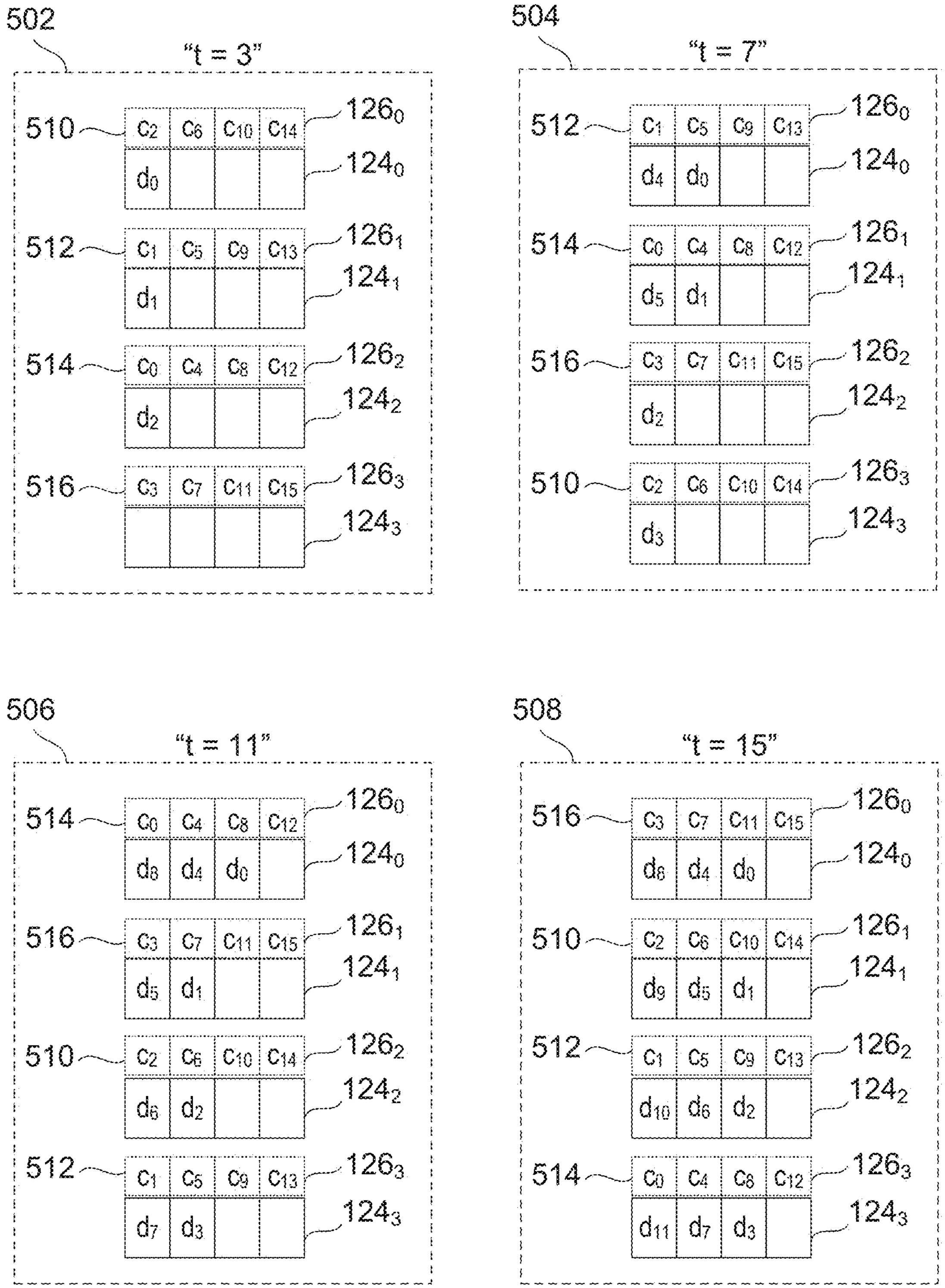
FIG. 5 illustrates cycles of data and coefficient sets for receiver channelizer circuitry.

FIG. 5 illustrates periods 502-508 for the receiver channelizer circuitry 100 of FIG. 1. A period corresponds to a cycle of a clock signal. The periods 502-508 are a snapshot of the branch circuitries 124 at different time indexes "t". Each time index corresponds to one or more clock cycles. As can be seen from FIG. 5, the periods 502-508 correspond to non-consecutive cycles of a clock signal. For example, the period 502 corresponds to a time index of "t=3", the period 504 corresponds to a time index of "t=7", the period 506 corresponds to a time index of "t=11", and the period 508 corresponds to a time index of "t=15". In one example, a time index of "t=3" corresponds to a third cycle of a clock signal, a time index of "t=7" corresponds to a seventh cycle of the clock signal, a time index of "t=11" corresponds to eleventh cycle of the clock signal, and a time index of "t=15" corresponds to a fifteenth cycle of the clock signal.

Figure 6:
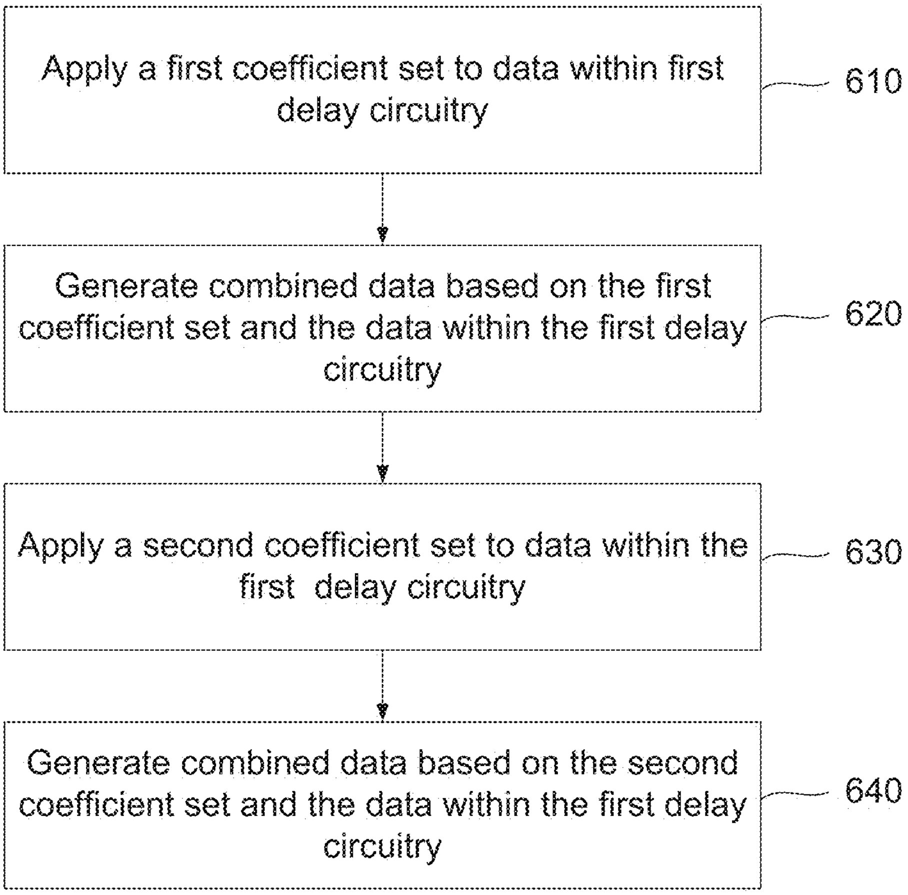
FIG. 6 illustrates a flowchart of a method for operating channelizer circuitry.

FIG. 5 illustrates the status of the delay circuitries $124_0$-$124_3$ and the selected coefficient sets $126_0$-$126_3$ of the branch circuitries $122_0$-$122_3$. As can be seen from FIG. 5, data loaded into the delay circuitries $124_0$-$124_3$ stays (is maintained) within the respective delay circuitry 124 from period to period. Between the periods 502-508, the coefficient sets 510-514 applied to each delay circuitry 124 changes. FIG. 5 is described with further reference to the method 600 illustrated by the flowchart of FIG. 6. The method 600 of FIG. 6 is performed by the receiver channelizer circuitry 100 of FIG. 1. In the example of FIG. 5, M=4 (e.g., the number of channels) and D=3 (e.g., the decimation factor). The oversampling factor is M/D (4/3 or 1.33).

At 610 of the method 600, a first coefficient set is applied to data within first delay circuitry. For example with reference to period 502 of FIG. 5, coefficient set 510 is applied to the data (e.g., do) within the delay circuitry $124_0$. The coefficient set 510 is the selected coefficient set $126_0$. At period 502, the control signal $127_0$ provides an indication to load data $d_0$ into the delay circuitry $124_0$. Further at the period 502, the coefficient set 512 is applied to the data (e.g., $d_1$) within the delay circuitry $124_1$. The control signal $127_1$ provides an indication to load data $d_1$ into the delay circuitry $124_1$. The coefficient set 514 is applied to the data (e.g., $d_2$) within the delay circuitry $124_2$. The control signal $127_2$ provides an indication to load data $d_2$ into the delay circuitry $124_2$. The control signal $127_3$ provides an indication to not load data into the delay circuitry $124_3$.

At 620, combined data is generated based on the first coefficient set and the data within the first delay circuitry. For example with reference to the period 502 of FIG. 5, combined data is generated by combining the coefficients of the coefficient set 510 with the data in the delay circuitry $124_0$. The data $d_0$ is combined with the coefficient $c_2$ by the accumulator circuitry 140. Combined data is generated by combining the coefficients of the coefficient set 512 with the data in the delay circuitry $124_1$. The data $d_1$ is combined with the coefficient $c_1$ by the accumulator circuitry 140. Combined data is generated by combining the coefficients of the coefficient set 514 with the data in the delay circuitry $124_2$. The data $d_2$ is combined with the coefficient $c_0$ by the accumulator circuitry 140.

The combined data determined from the data $d_0$ and the coefficient $c_2$ is output to a first port of the FFT circuitry 150 (or port $152_0$) as signal 141. The combined data determined from the data $d_1$ and the coefficient $c_1$ is output to a second port of the FFT circuitry 150 (or port $152_1$) as signal 141. The combined data determined from the data $d_2$ and the coefficient $c_0$ is output to a third port of the FFT circuitry 150 (or port $152_2$) as signal 141. The FFT circuitry 150 determines the signal 104 based on one or more of the above combined data received at ports 0, 1, and 2.

At 630 of the method 600, a second coefficient set is applied to data within the first delay circuitry. For example with reference to the period 504 of FIG. 5, coefficient set 512 is applied to data $d_4$ and do within the delay circuitry $124_0$. The coefficient set 512 is a second selected coefficient set $126_0$. At the period 504, the control signal $127_0$ provides an indication to load data $d_4$ into the delay circuitry $124_0$ and to shift the data $d_0$ within the delay circuitry $124_0$. Further, the coefficient set 514 is applied to the $d_5$ and $d_1$ within the delay circuitry $124_1$. The coefficient set 514 is stored within the selected coefficient set $126_1$. The control signal $127_1$ provides an indication to load data $d_5$ into the delay circuitry $\mathbf{124}_1$ and to shift the data $d_1$ within the delay circuitry $\mathbf{124}_1$. The coefficient set 516 is applied to the data $d_2$ within the delay circuitry $\mathbf{124}_2$. The coefficient set 516 is the selected coefficient set $\mathbf{126}_2$. The control signal $\mathbf{127}_2$ provides an indication to not to load additional data into the delay circuitry $\mathbf{124}_2$. The coefficient set 510 is the selected coefficient set $\mathbf{126}_3$. The control signal $\mathbf{127}_3$ provides an indication to load data $d_3$ into the delay circuitry $\mathbf{124}_3$.

At 640, combined data is generated based on the second coefficient set and the data within the first delay circuitry. For example with reference to period 504 of FIG. 5, combined data is generated by combining the coefficients of the coefficient set 512 with the data in the delay circuitry $\mathbf{124}_0$. The data $d_0$ is combined with the coefficient $c_5$ and data $d_4$ is combined with the coefficient $c_1$ by the accumulator circuitry 140. Combined data is generated by combining the coefficients of the coefficient set 514 with the data in the delay circuitry $\mathbf{124}_1$. The data $d_1$ is combined with the coefficient $c_4$ and the data $d_5$ is combined with the coefficient $c_0$ by the accumulator circuitry 140. Combined data is generated by combining the coefficients of the coefficient set 516 with the data in the delay circuitry $\mathbf{124}_2$. The data $d_2$ is combined with the coefficient $c_3$ by the accumulator circuitry 140. Combined data is generated by combining the coefficients of the coefficient set 510 with the data in the delay circuitry $\mathbf{124}_3$. The data $d_5$ is combined with the coefficient $c_2$ by the accumulator circuitry 140.

The combined data determined from the data $d_0$ and the coefficient $c_5$ and the data $d_4$ and the coefficient $c_1$ is output to the first port of the FFT circuitry 150 (or port $\mathbf{152}_0$). The combined data determined from the data $d_1$ and the coefficient $c_4$ and the data $d_5$ and the coefficient $c_0$ is output to the second port of the FFT circuitry 150 (or port $\mathbf{152}_1$). The combined data determined from the data $d_2$ and the coefficient $c_3$ is output to the third port of the FFT circuitry 150 (or port $\mathbf{152}_2$). The combined data determined from the data $d_5$ and the coefficient $c_2$ is output to a fourth port of the FFT circuitry 150 (or port $\mathbf{152}_3$). The FFT circuitry 150 determines the signal 104 based on one or more of the above combined data received at ports 0, 1, 2, and/or 3.

At period 506 of FIG. 5, the coefficient set 514 is applied to data $d_8$, $d_4$ and do within the delay circuitry $\mathbf{124}_0$. The coefficient set 514 is the selected coefficient set $\mathbf{126}_0$ selected at the third period. Further, the control signal $\mathbf{127}_0$ provides an indication to load data $d_8$ into the delay circuitry $\mathbf{124}_0$ and to shift the data $d_4$ and do within the delay circuitry $\mathbf{124}_0$. Further at the period 506, the coefficient set 516 is applied to the data $d_5$ and $d_1$ within the delay circuitry $\mathbf{124}_1$. The coefficient set 516 is the selected coefficient control set $\mathbf{126}_1$. Further, the control signal $\mathbf{127}_1$ provides an indication to not load data into the delay circuitry $\mathbf{124}_1$. At period 506, the coefficient set 510 is applied to the data $d_6$ and $d_2$ within the delay circuitry $\mathbf{124}_2$. The coefficient set 510 is the selected coefficient set $\mathbf{126}_2$. The control signal $\mathbf{127}_2$ provides an indication to load data $d_6$ into the delay circuitry $\mathbf{124}_2$, and to shift data $d_2$ within the delay circuitry $\mathbf{124}_2$. Further at period 506, the coefficient set 512 is the selected coefficient set $\mathbf{126}_3$. The control signal $\mathbf{127}_3$ provides an indication to load data $d_7$ into the delay circuitry $\mathbf{124}_3$, and to shift data $d_5$ within the delay circuitry $\mathbf{124}_3$.

Further during period 506, combined data is generated by combining the coefficients of the coefficient set 514 with the data in the delay circuitry $\mathbf{124}_0$. The data $d_0$ is combined with the coefficient $c_8$, the data $d_4$ is combined with the coefficient $c_4$, and the data $d_8$ is combined with the coefficient $c_8$ by the accumulator circuitry 140. Combined data is generated by combining the coefficients of the coefficient set 516 with the data in the delay circuitry $\mathbf{124}_1$. The data $d_1$ is combined with the coefficient $c_6$ and the data $d_5$ is combined with the coefficient $c_3$ by the accumulator circuitry 140. Combined data is generated by combining the coefficients of the coefficient set 510 with the data in the delay circuitry $\mathbf{124}_2$. The data $d_2$ is combined with the coefficient $c_6$ and the data $d_6$ is combined with the coefficient $c_2$ by the accumulator circuitry 140. Combined data is generated by combining the coefficients of the coefficient set 512 with the data in the delay circuitry $\mathbf{124}_3$. The data $d_3$ is combined with the coefficient $c_5$ and the data $d_7$ is combined with the coefficient $c_1$ by the accumulator circuitry 140.

The combined data determined from the data $d_0$ and the coefficient $c_5$, the data $d_4$ and the coefficient $c_1$, and the data $d_8$ and the coefficient $c_0$ is output to the first port of the FFT circuitry 150 (or port $\mathbf{152}_0$). The combined data determined from the data $d_1$ and the coefficient $c_1$ and the data $d_5$ and the coefficient $c_3$ is output to the second port of the FFT circuitry 150 (or port $\mathbf{152}_1$). The combined data determined from the data $d_2$ and the coefficient $c_6$ and the data $d_6$ and the coefficient $c_2$ is output to the third port of the FFT circuitry 150 (or port $\mathbf{152}_2$). The combined data determined from the data $d_3$ and the coefficient $c_5$ and the data $d_7$ and the coefficient $c_1$ is output to a fourth port of the FFT circuitry 150 (or port $\mathbf{152}_3$). The FFT circuitry 150 determines the signal 104 based on one or more of the above combined data received at ports 0, 1, 2, and/or 3.

At period 508 of FIG. 5, the coefficient set 516 is applied to data $d_5$, $d_4$ and do within the delay circuitry $\mathbf{124}_0$. The coefficient set 516 is the selected coefficient set $\mathbf{126}_0$ associated with the period 508. Further, the control signal $\mathbf{127}_0$ provides an indication to not load data into the delay circuitry $\mathbf{124}_0$. Further at the period 508, the coefficient set 510 is applied to the data $d_9$, $d_5$ and $d_1$ within the delay circuitry $\mathbf{124}_1$. The coefficient set 510 is the selected coefficient set $\mathbf{126}_1$ associated with the period 508. Further, the control signal $\mathbf{127}_1$ provides an indication to load data $d_0$ into the delay circuitry $\mathbf{124}_1$ and to shift the data $d_5$ and $d_1$ within the delay circuitry $\mathbf{124}_1$. At the period 506, the coefficient set 512 is applied to the data $d_{10}$, $d_6$ and $d_2$ within the delay circuitry $\mathbf{124}_2$. The coefficient set 512 is the selected coefficient set $\mathbf{126}_2$ associated with the period 508. The control signal $\mathbf{127}_2$ provides an indication to load data $d_{10}$ into the delay circuitry $\mathbf{124}_2$, and to shift data $d_6$ and $d_2$ within the delay circuitry $\mathbf{124}_2$. Further at period 508, the coefficient set 514 is the selected coefficient set $\mathbf{126}_3$ associated with the period 508 and is applied to data $d_{11}$, $d_7$, and $d_3$. The control signal $\mathbf{127}_3$ provides an indication to load data $d_0$ into the delay circuitry $\mathbf{124}_3$, and to shift data $d_5$ and $d_3$ within the delay circuitry $\mathbf{124}_3$.

Further during period 508, combined data is generated by combining the coefficients of the coefficient set 516 with the data in the delay circuitry $\mathbf{124}_0$. The data $d_0$ is combined with the coefficient $c_{11}$, the data $d_4$ is combined with the coefficient $c_7$, and the data $d_8$ is combined with the coefficient $c_3$ by the accumulator circuitry 140. Combined data is generated by combining the coefficients of the coefficient set 510 with the data in the delay circuitry $\mathbf{124}_1$. The data $d_1$ is combined with the coefficient $c_{10}$, the data $d_5$ is combined with the coefficient $c_6$ and the data $d_0$ is combined with the coefficient $c_2$ by the accumulator circuitry 140. Combined data is generated by combining the coefficients of the coefficient set 512 with the data in the delay circuitry $\mathbf{124}_2$. The data $d_2$ is combined with the coefficient $c_9$, the data $d_6$ is combined with the coefficient $c_2$, and the data $d_{10}$ is combined with the coefficient $c_1$ by the accumulator circuitry 140. Combined data is generated by combining the coefficients of the coefficient set 514 with the data in the delay circuitry $\mathbf{124}_3$. The data $d_3$ is combined with the coefficient $c_8$, the data $d_7$ is combined with the coefficient $c_4$, and the data $d_{11}$ is combined with the coefficient $c_0$ by the accumulator circuitry 140.

The combined data determined from the data $d_0$ and the coefficient $c_{11}$, the data $d_4$ and the coefficient $c_{10}$, and the data $d_5$ and the coefficient $c_3$ is output to the first port of the FFT circuitry 150 (or port $\mathbf{152}_0$). The combined data determined from the data $d_1$ and the coefficient $c_{10}$, the data $d_5$ and the coefficient $c_6$, and the data $d_0$ and the coefficient $c_2$ is output to the second port of the FFT circuitry 150 (or port $\mathbf{152}_1$). The combined data determined from the data $d_2$ and the coefficient $c_9$, the data $d_6$ and the coefficient $c_5$, and the data $d_{10}$ and the coefficient $c_1$ is output to the third port of the FFT circuitry 150 (or port $\mathbf{152}_2$). The combined data determined from the data $d_5$ and the coefficient $c_8$, the data $d_7$ and the coefficient $c_4$, and the data $d_1$ and the coefficient $c_0$ is output to a fourth port of the FFT circuitry 150 (or port $\mathbf{152}_3$). The FFT circuitry 150 determines the signal 104 based on one or more of the above combined data received at ports 0, 1, 2, and/or 3.

The FFT circuitry 150 generates the signal 104 based on the different combined signals received at the different ports. As is described above with regard to FIG. 5 and FIG. 6, during each period the output of a respective branch circuitry 122 is output to a respective port of the FFT circuitry 150 such that the association between branch circuitries 122 and ports of the FFT circuitry 150 does not change from period to period.

Figure 7:
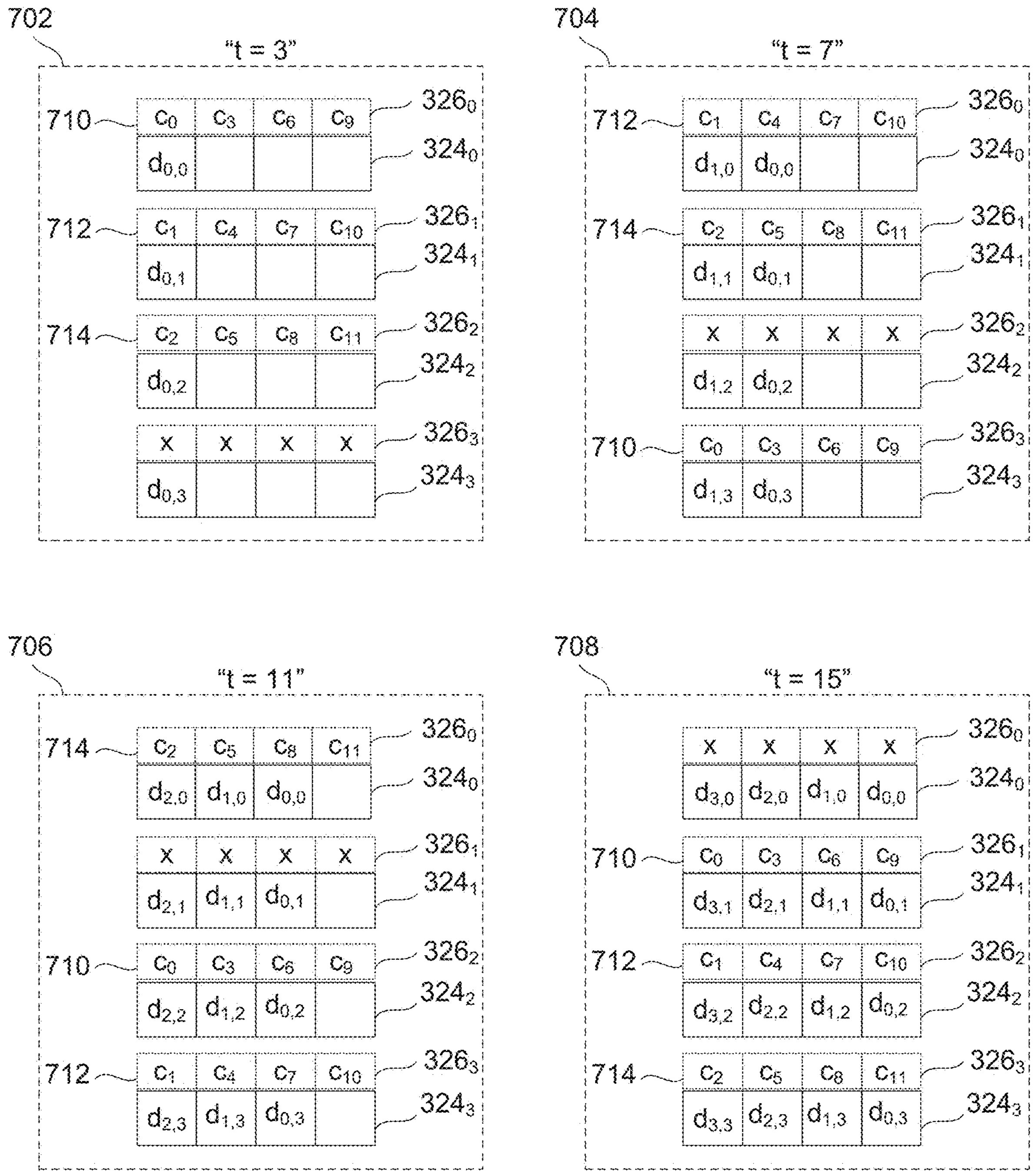
FIG. 7 illustrates cycles of data and coefficient sets for transmitter channelizer circuitry.

FIG. 7 illustrates periods 702-708 for the transmitter channelizer circuitry 300 of FIG. 3. A period corresponds to a cycle of a clock signal. The periods 702-708 are a snapshot of the branch circuitries 122 at different time indexes "t". Each time index corresponds to one or more clock cycles. As can be seen from FIG. 7, the periods 702-708 correspond to non-consecutive cycles of a clock signal. For example, the period 702 corresponds to a time index of "t=3", the period 704 corresponds to a time index of "t=7", the period 706 corresponds to a time index of "t=11", and the period 708 corresponds to a time index of "t=15". In one example, a time index of "t=3" corresponds to a third cycle of a clock signal, a time index of "t=7" corresponds to a seventh cycle of the clock signal, a time index of "t=11" corresponds to eleventh cycle of the clock signal, and a time index of "t=15" corresponds to a fifteenth cycle of the clock signal.

FIG. 7 illustrates the status of the delay circuitries $\mathbf{324}_0$-$\mathbf{324}_3$ and the selected coefficient sets $\mathbf{326}_0$-$\mathbf{326}_3$ of the branch circuitries $\mathbf{322}_0$-$\mathbf{322}_3$. As can be seen from FIG. 7, data loaded into the delay circuitries $\mathbf{324}_0$-$\mathbf{324}_3$ stays (is maintained) within the respective delay circuitry from period to period. Between periods 702-708, the coefficient sets 710-714 applied to the delay circuitries 324 changes. FIG. 7 is described with further reference to the method 600 illustrated by the flowchart of FIG. 6. As is described by the following, the method 600 of FIG. 6 is performed by the transmitter channelizer circuitry 300 of FIG. 3. In the example of FIG. 7, M=4 (e.g., the number of channels) and D=3 (e.g., the decimation factor). The oversampling factor is M/D (4/3 or 1.33).

At 610 of the method 600, a first coefficient set is applied to data within first delay circuitry. For example with reference to the period 702 of FIG. 7, coefficient set 710 is applied to the data (e.g., $d_{0,0}$) within the delay circuitry $\mathbf{324}_0$. The coefficient set 710 is the selected coefficient set $\mathbf{326}_0$. The data $d_{1,k}$ corresponds to channel j for vector k of the FFT circuitry 310. The data $d_{0,0}$ is received from a first channel of the FFT circuitry 310 (e.g., channel 0). Further at the period 702, the coefficient set 712 is applied to the data (e.g., $d_{0,1}$) within the delay circuitry $\mathbf{324}_1$. The coefficient set 712 is stored the selected coefficient set $\mathbf{326}_1$. The data $d_{0,1}$ is received from a second channel of the FFT circuitry 310 (e.g., channel 1). At period 702, the coefficient set 714 is applied to the data (e.g., $d_{0,2}$) within the delay circuitry $\mathbf{324}_2$. The coefficient set 714 is stored within the selected coefficient set $\mathbf{326}_2$. The data $d_{0,3}$ is received from a fourth channel of the FFT circuitry 310 (e.g., channel 3). The control signal $\mathbf{327}_0$ provides an indication to compute the output of the branch circuitry $\mathbf{322}_0$ from the data within the delay circuitry $\mathbf{324}_0$ and the coefficient set 710. The control signal $\mathbf{327}_1$ provides an indication to compute the output of the branch circuitry $\mathbf{322}_1$ from the data within the delay circuitry $\mathbf{324}_1$ and the coefficient set 712. The control signal $\mathbf{327}_2$ provides an indication to compute the output of the branch circuitry $\mathbf{322}_2$ from the data within the delay circuitry $\mathbf{324}_2$ and the coefficient set 714. The control signal $\mathbf{327}_3$ provides an indication to not compute the output of the branch circuitry $\mathbf{322}_3$ from the data within the delay circuitry $\mathbf{324}_2$ and the selected coefficient set $\mathbf{326}_2$. As no computation is performed, the coefficients are indicated as "x, x, x, x".

At 620, combined data is generated based on the first coefficient set and the data within the first delay circuitry. For example with reference to period 702 of FIG. 7, combined data is generated by combining the coefficients of the coefficient set 710 with the data in the delay circuitry $\mathbf{324}_0$. The data $d_{0,0}$ is combined with the coefficient $c_0$ by the accumulator circuitry 340. Combined data is generated by combining the coefficients of the coefficient set 712 with the data in the delay circuitry $\mathbf{324}_1$. The data $d_{0,1}$ is combined with the coefficient $c_1$ by the accumulator circuitry 340. Combined data is generated by combining the coefficients of the coefficient set 714 with the data in the delay circuitry $\mathbf{324}_2$. The data $d_{0,2}$ is combined with the coefficient $c_2$ by the accumulator circuitry 340.

At 630 of the method 600, a second coefficient set is applied to data within the first delay circuitry. For example with reference to the period 704 of FIG. 7, the coefficient set 712 is applied to data $d_{0,0}$ and $d_{1,0}$ within the delay circuitry $\mathbf{324}_0$. The coefficient set 712 is the selected coefficient set $\mathbf{326}_0$. The data $d_{0,0}$ and $d_{1,0}$ is received from the first channel of the FFT circuitry 310 (e.g., channel 0). The coefficient set 714 is applied to the $d_{1,1}$ and $d_{0,1}$ within the delay circuitry $\mathbf{324}_1$. The coefficient set 714 is the selected coefficient set $\mathbf{326}_1$. The data $d_{0,1}$ and $d_{1,1}$ is received from the second channel of the FFT circuitry 310 (e.g., channel 1). At period 704, the coefficient set 710 is applied to the data $d_{0,3}$ and $d_{1,3}$ within the delay circuitry $\mathbf{324}_3$. The coefficient set 710 is the selected coefficient set $\mathbf{326}_3$. The data $d_{0,3}$ and $d_{1,3}$ is received from a fourth channel of the FFT circuitry 310 (e.g., channel 3).

The control signal $\mathbf{327}_0$ provides an indication to compute the output of the branch circuitry $\mathbf{322}_0$ from the data within the delay circuitry $\mathbf{324}_0$ and the coefficient set 712. The control signal $\mathbf{327}_1$ provides an indication to compute the output of the branch circuitry $\mathbf{322}_1$ from the data within the delay circuitry $\mathbf{324}_1$ and the coefficient set 714 of the selected coefficient set $\mathbf{326}_1$. The control signal $\mathbf{327}_2$ provides an indication to not compute the output of the branch circuitry $\mathbf{322}_2$ and the selected coefficient set $\mathbf{326}_2$. The control signal $\mathbf{327}_3$ provides an indication to compute the output of the branch circuitry $\mathbf{322}_3$ from the data within the delay circuitry $\mathbf{324}_3$ and the coefficient set 710.

At 640, combined data is generated based on the second coefficient set and the data within the first delay circuitry. For example with reference to period 704 of FIG. 7, combined data is generated by combining the coefficients of the coefficient set 712 with the data in the delay circuitry $\mathbf{324}_0$. The data $d_{0,0}$ is combined with the coefficient $c_4$ and data $d_{1,0}$ is combined with the coefficient $c_1$ by the accumulator circuitry 340. Combined data is generated by combining the coefficients of the coefficient set 714 with the data in the delay circuitry $\mathbf{324}_1$. The data $d_{0,1}$ is combined with the coefficient $c_5$ and the data $d_{1,1}$ is combined with the coefficient $c_2$ by the accumulator circuitry 340. Combined data is generated by combining the coefficients of the coefficient set 710 with the data in the delay circuitry $\mathbf{324}_3$. The data $d_{0,3}$ is combined with the coefficient $c_3$ and the data $d_{1,3}$ is combined with the coefficient $c_0$ by the accumulator circuitry 340.

The buffer circuitry 350 determines the signal 304 based on one or more of the above combined data.

At period 706 of FIG. 7, the coefficient set 714 is applied to data $d_{0,0}$, $d_{1,0}$ and $d_{2,0}$ within the delay circuitry $\mathbf{324}_0$. The coefficient set 714 is the selected coefficient set $\mathbf{326}_0$. The data $d_{0,0}$, $d_{1,0}$, and $d_{2,0}$ is received from the first channel of the FFT circuitry 310 (e.g., channel 0). Further at the period 706, the coefficient set 710 is applied to the data $d_{0,2}$, $d_{1,2}$, and $d_{2,2}$ within the delay circuitry $\mathbf{324}_2$. The coefficient set 710 is the selected coefficient set $\mathbf{326}_1$. The data $d_{0,2}$, $d_{1,2}$, and $d_{2,2}$ is received from the third channel of the FFT circuitry 310 (e.g., channel 2). At the period 706, the coefficient set 712 is applied to the data $d_{0,3}$, $d_{1,3}$, and $d_{2,3}$ within the delay circuitry $\mathbf{324}_3$. The coefficient set 712 is the selected coefficient set $\mathbf{326}_3$. The data $d_{0,3}$, $d_{1,3}$, and $d_{2,3}$ is received from the fourth channel of the FFT circuitry 310 (e.g., channel 3).

The control signal $\mathbf{327}_0$ provides an indication to compute the output of the branch circuitry $\mathbf{322}_0$ from the data within the delay circuitry $\mathbf{324}_0$ and the coefficient set 714 of the selected coefficient set $\mathbf{326}_0$. The control signal $\mathbf{327}_1$ provides an indication to not compute an output from the branch circuitry $\mathbf{322}_1$. The control signal $\mathbf{327}_2$ provides an indication to compute the output of the branch circuitry $\mathbf{322}_2$ from the data within the delay circuitry $\mathbf{324}_2$ and the coefficient set 710 of the selected coefficient set $\mathbf{326}_2$. The control signal $\mathbf{327}_3$ provides an indication to compute the output of the branch circuitry $\mathbf{322}_3$ from the data within the delay circuitry $\mathbf{324}_3$ and the coefficient set 712 of the selected coefficient set $\mathbf{326}_3$.

Further during period 706, combined data is generated by combining the coefficients of the coefficient set 714 with the data in the delay circuitry $\mathbf{324}_0$. Combined data is generated by combining the coefficients of the coefficient set 710 with the data in the delay circuitry $\mathbf{324}_2$. Combined data is generated by combining the coefficients of the coefficient set 712 with the data in the delay circuitry $\mathbf{324}_3$.

The buffer circuitry 350 determines the signal 104 based on one or more of the above combined data.

At period 708 of FIG. 7, the coefficient set 710 is applied to the data $d_{0,1}$, $d_{1,1}$, $d_{2,1}$ and $d_{3,1}$ within the delay circuitry $\mathbf{324}_1$. The coefficient set 710 is the selected coefficient set $\mathbf{326}_1$. The coefficient set 712 is applied to the data $d_{0,2}$, $d_{1,2}$, $d_{2,2}$ and $d_{3,2}$ within the delay circuitry $\mathbf{324}_2$. The coefficient set 712 is the selected coefficient set $\mathbf{326}_2$. The coefficient set 714 is the selected coefficient set $\mathbf{326}_3$ and is applied to data $d_{0,3}$, $d_{1,3}$, $d_{2,3}$ and $d_{3,3}$.

The control signal $\mathbf{327}_0$ provides an indication to not compute an output from the branch circuitry $\mathbf{322}_0$. The control signal $\mathbf{327}_1$ provides an indication to compute the output of the branch circuitry $\mathbf{322}_1$ from the data within the delay circuitry $\mathbf{324}_1$ and the coefficient set 710. The control signal $\mathbf{327}_2$ provides an indication to compute the output of the branch circuitry $\mathbf{322}_2$ from the data within the delay circuitry $\mathbf{324}_2$ and the coefficient set 712. The control signal $\mathbf{327}_3$ provides an indication to compute the output of the branch circuitry $\mathbf{322}_3$ from the data within the delay circuitry $\mathbf{324}_3$ and the coefficient set 714.

Further during period 708, combined data is generated by combining the coefficients of the coefficient set 710 with the data in the delay circuitry $\mathbf{324}_1$ by the accumulator circuitry 340. Combined data is generated by combining the coefficients of the coefficient set 712 with the data in the delay circuitry $\mathbf{324}_2$ by the accumulator circuitry 340. Combined data is generated by combining the coefficients of the coefficient set 714 with the data in the delay circuitry $\mathbf{324}_3$ by the accumulator circuitry 340.

The buffer circuitry 350 generates the signal 304 based on the different combined signals. As is described above with regard to FIG. 6 and FIG. 7, during each cycle the output of a branch circuitry 322 receives data from a respective channel of the FFT circuitry 310 such that the association between branch circuitries 322 and channels of the FFT circuitry 310 does not change from period to period (or clock cycle to clock cycle).

In one or more examples, data moves within the branch circuitries 122 or 322 independent from each other. From cycle to cycle, data does not move between branch circuitries 122 or 322. From cycle to cycle, a coefficient set is selected and is applied to each branch circuitry 122 or 322. The coefficient set differs from cycle to cycle. In one example, the coefficient set is the same between at least two cycles. In one example, in non-oversampled channelizers, where M is the number of channels and D is the decimation factor, and M=D, the same coefficient set may applied between at least two cycles. Accordingly, with reference to FIG. 1, the output of the accumulator circuitry 140 is not reordered from cycle to cycle, reducing the processing resources and complexity of the corresponding receiver channel circuitry. With reference to FIG. 3, the output of the IFFT circuitry is not reordered and/or post correction is not applied from cycle to cycle, reducing the processing resources and complexity of the corresponding receiver channel circuitry.

Figure 8:
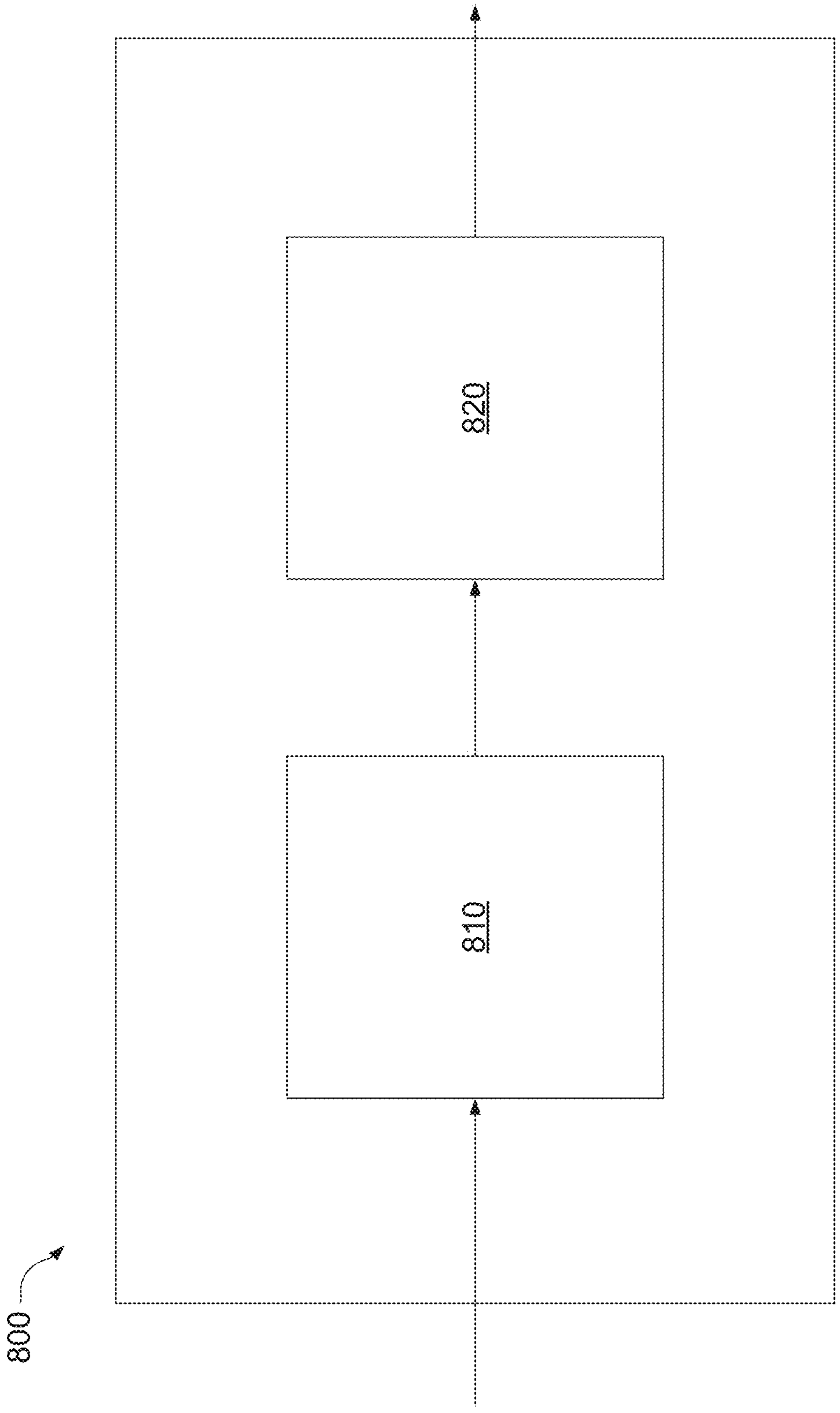
FIG. 8 illustrates a block diagram of a signal processing system.

FIG. 8 illustrates a block diagram of a signal processing system 800, according to one or more examples. The signal processing system 800 includes channelizer circuitry 810 and processing circuitry 820. In one example, the channelizer circuitry 810 is one of the receiver channelizer circuitry 100 of FIG. 1 or the transmitter channelizer circuitry 300 of FIG. 3. The processing circuitry 820 receives an output signal (e.g., the signal 104 of FIG. 1 or 304 of FIG. 3) from the channelizer circuitry 810. The processing circuitry 820 performs spectrum analysis and/or other signal processing operations on the signal received from the channelizer circuitry 810.

In one or more examples, the channelizer circuitry 810 is configurable from a receiver channelizer circuitry and a transmitter channelizer circuitry. In one example, to switch the channelizer circuitry 810 between receiver channelizer circuitry and transmitter channelizer circuitry, multiplexer circuitry is used to determine the order of PFB circuitry or FFT circuitry. For example, to configure the channelizer circuitry 810 as receiver channelizer circuitry, the multiplexer circuitry is used to couple the output of the PFB circuitry to the input of the FFT circuitry. To configure the channelizer circuitry 810 as transmitter channelizer circuitry, the multiplexer circuitry is used to couple output of the FFT to the input of the PFB circuitry. Further, to configure the channelizer circuitry 810 as a receiver channelizer circuitry or a transmitter channelizer circuitry, the phase control circuitry is selectively configured to output the strobe signal 127 for a receiver channelizer circuitry or the control signal 327 for a transmitter channelizer circuitry. Additionally, or alternatively, multiplexer circuitry is used to determine whether the input is buffered (to cross a clock domain) for receiver channelizer circuitry or the output is buffered (to cross a clock domain) for at transmitter channelizer circuitry.

Figure 9:
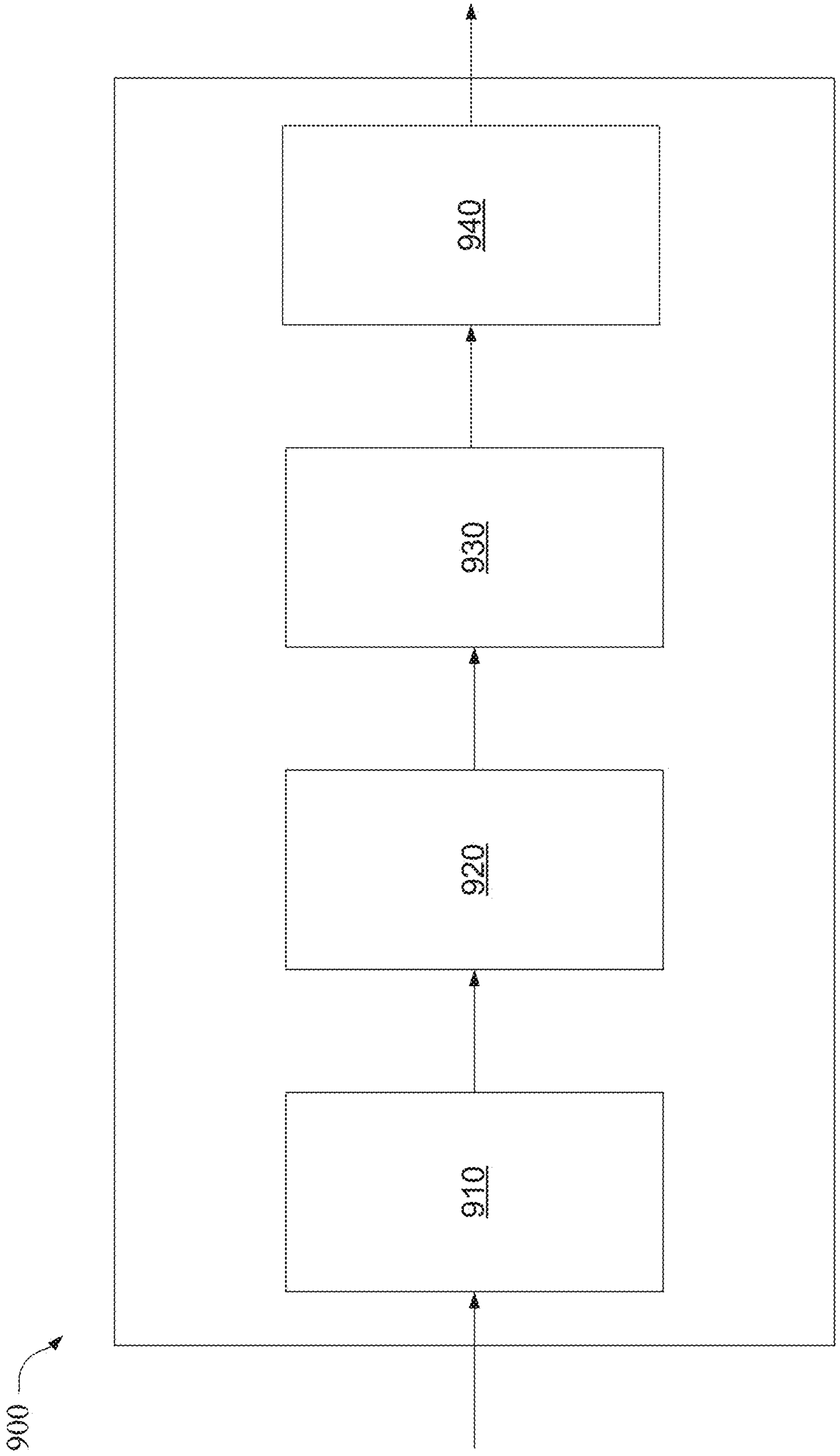
FIG. 9 illustrates a block diagram of a signal processing system.

FIG. 9 illustrates a block diagram of a signal processing system 900, according to one or more examples. The signal processing system 900 includes receiver channelizer circuitry 910, processing circuitry 920, transmitter channelizer circuitry 930, and processing circuitry 940. The receiver channelizer circuitry 910 is configured similar to the receiver channelizer circuitry 100 of FIG. 1. The transmitter channelizer circuitry 930 is configured similar to the transmitter channelizer circuitry 300 of FIG. 3. The processing circuitry 920 receives an output signal (e.g., the signal 104 of FIG. 1) from the channelizer circuitry 910. The processing circuitry 920 performs beamforming on the signal received from the channelizer circuitry 810. The transmitter channelizer circuitry 930 receives the output of the processing circuitry 920 to generate a combined signal. The transmitter channelizer circuitry 930 outputs the combined signal to the processing circuitry 940 that performs additional signal processing operations (e.g., spectrum analysis and/or other signal processing operations) on the signal output from the transmitter channelizer circuitry 930.

While the foregoing is directed to specific examples, other and further examples may be devised without departing from the basic scope thereof, and the scope thereof is determined by the claims that follow.

What is claimed is:

1. A channelizer circuitry comprising:

first delay circuitry configured to receive first data, wherein the channelizer circuitry is configured to:

generate first combined data based on the first data and a first coefficient set and second combined data based on the first data and a second coefficient set, wherein the first coefficient set differs from the second coefficient set; and output a first signal based on at least one of the first combined data and the second combined data; and phase control circuitry configured to output a first control signal comprising a first indication to output the first coefficient set and a second indication to output the second coefficient set.

2. The channelizer circuitry of claim 1, further comprising memory circuitry configured to output the first coefficient set based on the first control signal comprising the first indication and output the second coefficient set based on the first control signal comprising the second indication.

3. The channelizer circuitry of claim 1, wherein the phase control circuitry is further configured to control loading of data into the first delay circuitry based on a decimation factor and the first control signal.

4. The channelizer circuitry of claim 1, wherein the phase control circuitry is further configured to control generating the first combined data based on a decimation factor and the first control signal.

5. The channelizer circuitry of claim 1, further comprising accumulator circuitry configured to receive the first data and the first coefficient set and generate the first combined data from the first data and the first coefficient set.

6. The channelizer circuitry of claim 1, further comprising Fast Fourier Transform (FFT) circuitry configured to generate the first signal, wherein the FFT circuitry comprises a first port associated with the first delay circuitry and configured to receive the first combined data and the second combined data.

7. The channelizer circuitry of claim 6 further comprising a plurality of delay circuitries, wherein each of the plurality of delay circuitries is associated with a respective port of the FFT circuitry.

8. The channelizer circuitry of claim 1 further comprising:

a plurality of delay circuitries; and

FFT circuitry configured to output the first data, wherein each of the plurality of delay circuitries is associated with a respective channel of the FFT circuitry.

9. A method comprising:

receiving first data at a first delay circuitry of channelizer circuitry;

generating first combined data based on the first data and a first coefficient set;

generating second combined data based on the first data and a second coefficient set, wherein the first coefficient set differs from the second coefficient set;

outputting a first signal based on at least one of the first combined data and the second combined data; and generating, via phase control circuitry of the channelizer circuitry, a first control signal comprising a first indication to output the first coefficient set and a second indication to output the second coefficient set.

10. The method of claim 9 further comprising:

outputting, via memory circuitry of the channelizer circuitry, the first coefficient set based on the first control signal comprising the first indication during a first period and the second coefficient set based on the first control signal comprising the second indication during a second period.

11. The method of claim 10, wherein the memory circuitry comprises a plurality of coefficient sets, and wherein the first coefficient set is a first one of the plurality of coefficient sets and the second coefficient set is a second one of the plurality of coefficient sets.

12. The method of claim 9, wherein the first data is loaded into the first delay circuitry based on a comparison of a decimation factor and the first control signal.

13. The method of claim 9, wherein the first combined data is generated based on a comparison of a decimation factor and the first control signal.

14. The method of claim 9, wherein the first signal is generated by Fast Fourier Transform (FFT) circuitry of the channelizer circuitry, wherein each port of the FFT circuitry is associated with a respective delay circuitry of the channelizer circuitry.

15. The method of claim 9 further comprising outputting, via an FFT circuitry of the channelizer circuitry, the first data, wherein each delay circuitry of the channelizer circuitry is associated with a respective channel of the FFT circuitry.

16. A signal processing system comprising:

channelizer circuitry comprising:

first delay circuitry configured to receive first data, wherein the channelizer circuitry is configured to:

generate first combined data based on the first data and a first coefficient set and second combined data based on the first data and a second coefficient set, wherein the first coefficient set differs from the second coefficient set; and output a first signal based on at least one of the first combined data and the second combined data; and phase control circuitry configured to output a first control signal comprising a first indication to output the first coefficient set and a second indication to output the second coefficient set; and processing circuitry configured to receive the first signal and perform a signal processing operation on the first signal.

17. The signal processing system of claim 16, wherein one of:

the channelizer circuitry further comprises first Fast Fourier Transform (FFT) circuitry configured to generate the first signal, wherein the first FFT circuitry comprises a plurality of ports, and wherein each of the plurality of ports is associated with a respective delay circuitry of the channelizer circuitry; and the channelizer circuitry further comprises:

a plurality of delay circuitries; and second FFT circuitry configured to output the first data, wherein each of the plurality of delay circuitries is associated with a respective channel of the second FFT circuitry.

* * * * *